(12) United States Patent
Xu et al.

(10) Patent No.: US 11,153,652 B2
(45) Date of Patent: Oct. 19, 2021

(54) METHOD FOR DISPLAYING LIVE BROADCAST ROOM, APPARATUS, DEVICE, AND STORAGE MEDIUM

(71) Applicant: GUANGZHOU HUYA INFORMATION TECHNOLOGY CO., LTD., Guangdong (CN)

(72) Inventors: Zihao Xu, Guangzhou (CN); Qingfeng Cai, Guangzhou (CN)

(73) Assignee: GUANGZHOU HUYA INFORMATION TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/976,204

(22) PCT Filed: May 24, 2019

(86) PCT No.: PCT/CN2019/088351
§ 371 (c)(1),
(2) Date: Aug. 27, 2020

(87) PCT Pub. No.: WO2019/228268
PCT Pub. Date: May 12, 2019

(65) Prior Publication Data
US 2021/0006864 A1 Jan. 7, 2021

(30) Foreign Application Priority Data

May 28, 2018 (CN) .......................... 201810520540.0

(51) Int. Cl.
*H04N 21/431* (2011.01)
*H04N 21/466* (2011.01)
*H04N 21/435* (2011.01)

(52) U.S. Cl.
CPC ....... *H04N 21/4665* (2013.01); *H04N 21/435* (2013.01); *H04N 21/4312* (2013.01)

(58) Field of Classification Search
None
See application file for complete search history.

(56) References Cited

U.S. PATENT DOCUMENTS 8,688,716 B1 * 4/2014 DuHadway ............ G06K 9/033
707/748
10,002,296 B2 * 6/2018 Wang ................. G06K 9/00718
(Continued)

FOREIGN PATENT DOCUMENTS

CN 106096031 A 11/2016
CN 107071501 A 8/2017
(Continued)

OTHER PUBLICATIONS

International Search Report dated Aug. 15, 2019 for PCT/CN2019/088351.
(Continued)

*Primary Examiner* — William J Kim
(74) *Attorney, Agent, or Firm* — Schmeiser, Olsen & Watts, LLP

(57) ABSTRACT

Provided is a method and an apparatus for displaying a live broadcast room, a device, and a storage medium. The method includes: acquiring a live broadcast screenshot of at least one live broadcast room under a target classification label; inputting the live broadcast screenshot of the at least one live broadcast room into an image detection model to obtain a live broadcast screenshot that satisfies a set type condition; adding a display identifier to a live broadcast room corresponding to the live broadcast screenshot of the set type condition; and arranging and displaying the at least one live broadcast room according to the display identifier in a display interface corresponding to the target classification label.

11 Claims, 5 Drawing Sheets

(56) References Cited

U.S. PATENT DOCUMENTS

| | | | |
|---|---|---|---|
| 10,529,137 B1* | 1/2020 | Black | G06N 3/08 |
| 10,911,790 B2* | 2/2021 | Zhang | H04N 21/84 |
| 2009/0125376 A1 | 5/2009 | Sundaresan et al. | |
| 2010/0035688 A1* | 2/2010 | Picunko | G06F 3/011 |
| | | | 463/39 |
| 2011/0016492 A1* | 1/2011 | Morita | H04N 21/4622 |
| | | | 725/58 |
| 2012/0316660 A1* | 12/2012 | Luo | G06F 16/78 |
| | | | 700/94 |
| 2013/0097259 A1* | 4/2013 | Li | H04L 51/26 |
| | | | 709/206 |
| 2013/0282747 A1* | 10/2013 | Cheng | G06F 16/78 |
| | | | 707/758 |
| 2014/0267749 A1* | 9/2014 | Frigon | H04N 1/00127 |
| | | | 348/159 |
| 2017/0155631 A1* | 6/2017 | Du | G06F 16/9535 |
| 2017/0228600 A1 | 8/2017 | Syed et al. | |
| 2018/0027298 A1* | 1/2018 | Paglia | H04N 21/4424 |
| | | | 725/37 |
| 2019/0026277 A1* | 1/2019 | Doyle | H04N 5/77 |
| 2019/0182514 A1* | 6/2019 | Zhang | H04N 21/235 |
| 2020/0016495 A1* | 1/2020 | Cruz | A63F 13/795 |
| 2021/0035559 A1* | 2/2021 | Xu | G10L 25/78 |

FOREIGN PATENT DOCUMENTS

| | | |
|---|---|---|
| CN | 107172501 A | 9/2017 |
| CN | 107318044 A | 11/2017 |
| CN | 108076354 A | 5/2018 |
| CN | 108769823 A | 11/2018 |

OTHER PUBLICATIONS

Chinese Office Action dated Mar. 14, 2019 for Application No. 201810520540.0.

* cited by examiner

METHOD FOR DISPLAYING LIVE BROADCAST ROOM, APPARATUS, DEVICE, AND STORAGE MEDIUM

CROSS-REFERENCES TO RELATED APPLICATIONS

This application claims priority to PCT Application No. PCT/CN2019/088351, filed on May 24, 2019 which is based upon and claims priority to Chinese Patent Application No. 201810520540.0, filed on May 28, 2018, the entire contents both of which are incorporated herein by reference.

FIELD OF TECHNOLOGY

Embodiments of the present application relate to the field of Internet technologies and, for example, relate to a method and an apparatus for displaying a live broadcast room, a device, and a storage medium.

BACKGROUND

With the rapid development of Internet technologies, the live streaming, as a new technology field, comes to the attention of the public. Users can watch the excellent performances of streamers in live broadcast rooms on their terminal devices.

The most common way to display live broadcast rooms is to arrange and display live broadcast rooms according to popularity values or the number of viewers. In the field of entertainment live broadcasting, dancing by streamers is a popular performance form.

SUMMARY

An aspect relates to a method and an apparatus for displaying a live broadcast room, a device, and a storage medium, so as to display live broadcast rooms in which a performance is in progress to a user in a timely and effective manner such that the user can timely find the live broadcast rooms in which a performance is currently in progress.

In a first aspect, the embodiments of the present application provide a method for displaying a live broadcast room. The method includes the steps described below.

A live broadcast screenshot of at least one live broadcast room under a target classification label is acquired.

The live broadcast screenshot of the at least one live broadcast room is input into an image detection model to obtain a live broadcast screenshot that satisfies a set type condition.

A display identifier is added to a live broadcast room corresponding to the live broadcast screenshot of the set type condition.

The at least one live broadcast room is arranged and displayed according to the display identifier in a display interface corresponding to the target classification label.

In a second aspect, the embodiments of the present application further provide an apparatus for displaying a live broadcast room. The apparatus includes a screenshot acquiring module, a screenshot inputting module, an identifier adding module and an arranging and displaying module.

The screenshot acquiring module is configured to acquire a live broadcast screenshot of at least one live broadcast room under a target classification label.

The screenshot inputting module is configured to input the live broadcast screenshot of the at least one live broadcast room into an image detection model to obtain a live broadcast screenshot that satisfies a set type condition.

The identifier adding module is configured to add a display identifier to a live broadcast room corresponding to the live broadcast screenshot of the set type condition.

The arranging and displaying module is configured to arrange and display the at least one live broadcast room according to the display identifier in a display interface corresponding to the target classification label.

In a third aspect, the embodiments of the present application further provide a computer device.

The computer device includes one or more processors.

The computer device further includes a memory, which is configured to store one or more programs.

When executed by the one or more processors, the one or more programs enable the one or more processors to implement the method for displaying a live broadcast room of any one of the embodiments of the present application.

In a fourth aspect, the embodiments of the present application further provide a computer-readable storage medium having a computer program stored thereon that, upon execution by a processor, implements the method for displaying a live broadcast room of any one of embodiments of the present application.

BRIEF DESCRIPTION

Some of the embodiments will be described in detail, with reference to the following figures, wherein like designations denote like members, wherein.

DETAILED DESCRIPTION

Figure 1A:
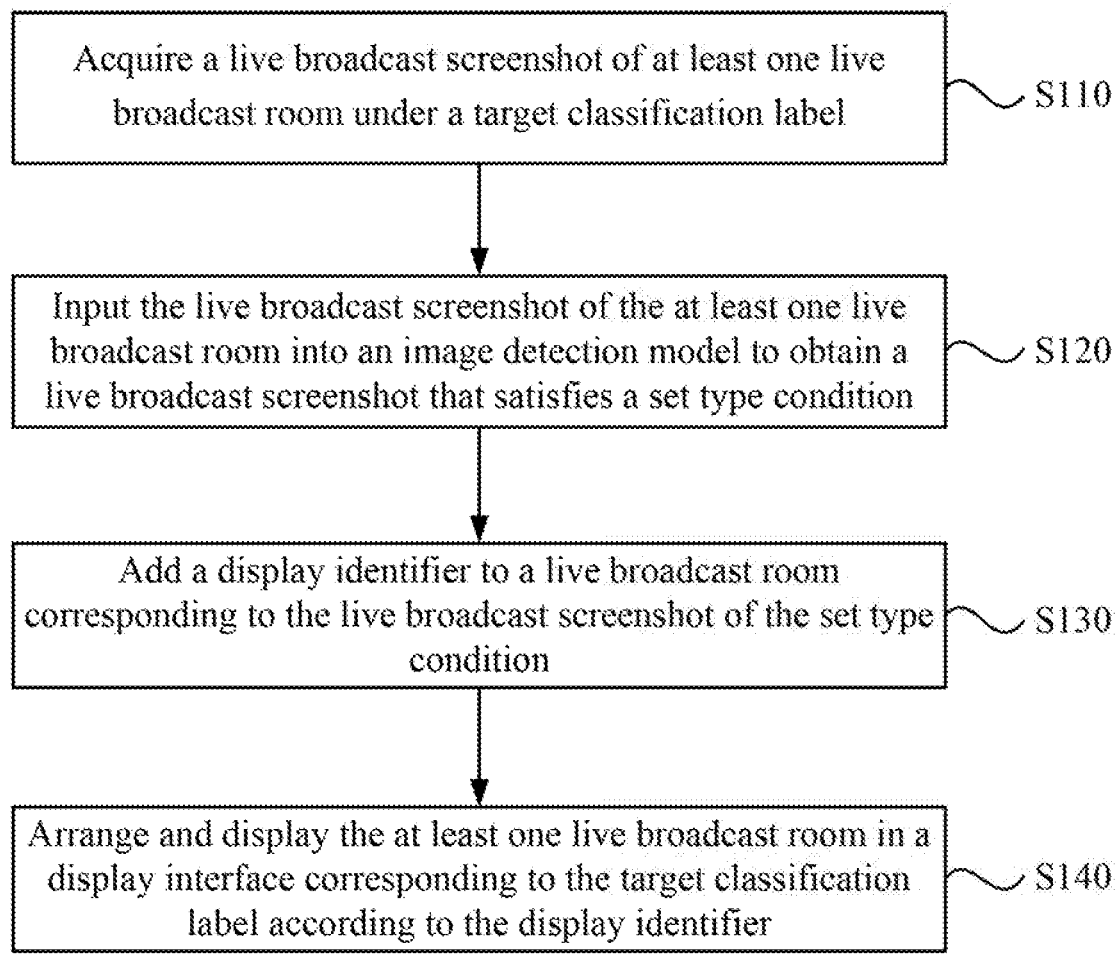
FIG. 1A is a flowchart of a method for displaying a live broadcast room provided by an embodiment one of the present application.

The present application will be described below in conjunction with drawings and embodiments. It is to be understood that the embodiments set forth below are intended to illustrate and not to limit the present application. It is to be noted that to facilitate description, only part, not all, of structures related to the present application are illustrated in the drawings.

Embodiment One

FIG. 1A is a flowchart of a method for displaying a live broadcast room provided by an embodiment one of the present application. The method is applicable to a case where live broadcast rooms on an online live broadcast platform are arranged and displayed. The method can be executed by an apparatus for displaying a live broadcast room, which can be composed of hardware and/or software and is generally integrated into a server and all terminals capable of providing an online live broadcast function. This embodiment is illustrated with the server as an executing object. The method provided by this embodiment includes the steps described below.

In S110, a live broadcast screenshot of at least one live broadcast room under a target classification label is acquired.

In this embodiment, the live broadcast room may be an online live broadcast room in which the performance is in progress and which is provided by an online live broadcast platform. The classification label is a label attached to the live broadcast room on the online live broadcast platform according to a type of the live broadcast room. The live broadcast rooms are displayed in a classification manner according to the classification labels to which the live broadcast rooms belong. In one embodiment, the target classification label may be a live broadcast room having a particular body performance, such as a dance type live broadcast room. In one embodiment, the online live broadcast platform can be composed of a server and multiple terminals. In one embodiment, the streamer can log in an streamer account on a terminal used by himself and establish a live broadcast room or enter a live broadcast room associated with the streamer account, so as to perform live broadcasting, and a user can also enter the live broadcast room by logging in a user account on his terminal and watch live broadcast content of the streamer.

Exemplarily, a live broadcast screenshot of at least one live broadcast room under the target classification label may be acquired at preset frequency intervals, where the at least one live broadcast room is in a live broadcasting state. For example, screenshots of current live broadcast rooms are acquired from multiple dance type live broadcast rooms in which the live broadcasting is currently in progress on an online live broadcast platform every 10 seconds.

In the online live broadcasting, since the content of the live broadcast performance of the streamer is different, the acquired live broadcast screenshots also have differences. For example, if the streamer is dancing, the content of the live broadcast screenshot will include standing human body features, which have a certain difference from the live broadcast screenshot acquired when the streamer is not dancing, so that the live broadcast screenshots can be recognized through the difference. For example, the head and legs of a human body can be recognized from a live broadcast screenshot acquired from a live broadcast room in which the streamer is currently dancing; only the head and/or hands of the human body can be recognized at most from a live broadcast screenshot acquired from a live broadcast room in which the streamer is not dancing.

In S120, the live broadcast screenshot of the at least one live broadcast room is input into an image detection model to obtain a live broadcast screenshot that satisfies a set type condition.

In this embodiment, the image detection model is used for recognizing the input live broadcast screenshot to recognize the live broadcast screenshot that satisfies the set type condition. The set type condition may include a dance condition. In one embodiment, the image detection model may be a model trained according to a preset deep learning algorithm. Exemplarily, by inputting the acquired live broadcast screenshot into the image detection model, a live broadcast screenshot meeting the dance condition can be screened out, that is, the live broadcast room in which the dance performance is in progress can be recognized from multiple dance type live broadcast rooms through the image detection model.

In one embodiment, the image detection model is obtained by training a first deep learning model using dance type live broadcast image samples and a non-dance type live broadcast image samples.

In one embodiment, the operation principle of the image detection model may be that when a live broadcast screenshot is input, the image detection model performs image recognition on the input live broadcast screenshot, analyzes recognized image information, determines whether the image information included in the input live broadcast screenshot satisfies the set type condition, and if the image information included in the input live broadcast screenshot satisfies the set type condition, outputs the live broadcast screenshot, otherwise, discards the live broadcast screenshot. For example, a live broadcast screenshot acquired from a live broadcast room in which a streamer is dancing currently is input into the image detection model, and after performing recognition and analysis on the live broadcast screenshot, the image detection model determines that the live broadcast screenshot satisfies the dance condition, and outputs the live broadcast screenshot.

The purpose of inputting the live broadcast screenshot into the image detection model in this embodiment is to determine whether a performance is in progress in the live broadcast room according to the acquired live broadcast screenshot, and screen out the live broadcast room in which the performance is in progress so as to mark a display identifier on the live broadcast room in which the performance is in progress, and distinctively display this live broadcast room from other live broadcast rooms which are live but have no performance in progress, such that the user can rapidly find the live broadcast room in which the wonderful performance is in progress.

In one embodiment, before the live broadcast screenshot of the at least one live broadcast room is input into the image detection model to obtain the live broadcast screenshot that satisfies the set type condition, the method further includes the following steps: respectively obtaining dance type live broadcast image samples and non-dance type live broadcast image samples; and training the first deep learning model by using the dance type live broadcast image samples and the non-dance type live broadcast image samples to obtain the image detection model.

In one embodiment, the live broadcast image samples may be extracted from multiple live broadcast videos in the online live broadcast platform, or may be downloaded from the Internet through a specific search engine, which is not limited herein. Taking a case of extracting the live broadcast image sample from multiple live videos on the online live broadcast platform as an example, multiple live videos under multiple classification labels are searched for from a target online live broadcast platform, then multiple video frames are extracted from the multiple live videos respectively, and a dance type or non-dance type label is marked on the extracted video frames so as to obtain the live broadcast image samples. In this embodiment, the live broadcast classes include, but are not limited to, dance type, singing type, food type, competitive game type, traveling type, beauty and make-up type, and the like. In one embodiment, specifically, the acquired live broadcast samples may be classified in a manual evaluation classification manner, that is, in a manual manner, the video frames which are acquired from multiple live videos and which contain dance performances are labeled with dance type labels as dance type live broadcast image samples, and other video frames which do not contain dance performances are labeled with non-dance type labels as non-dance type live broadcast image samples.

In this embodiment, the first deep learning model may be a training model established based on an artificial neural network algorithm, such as Convolutional Neural Network (CNN). CNN is a feedforward neural network, and the artificial neurons of the CNN can respond to a part of peripheral units within a coverage range. The CNN has excellent performance on large-scale image processing. The training process of the first deep learning model can be the process of adjusting neural network parameters. The optimal neural network parameters can be obtained through continuous training, and the first deep learning model having the optimal neural network parameters is the final model to be obtained. Exemplarily, after multiple live broadcast image samples are obtained, the first deep learning model is trained by using multiple live broadcast image samples, and the neural network parameters in the first deep learning model are constantly adjusted such that the first deep learning model gets the ability to recognize the input live broadcast screenshot, so that the image detection model is obtained.

In one embodiment, the step of respectively obtaining the dance type live broadcast image sample and the non-dance type live broadcast image samples includes: calling a search engine interface to search for and download multiple video files matched with set keywords corresponding to the dance type and the non-dance type respectively; respectively extracting multiple video frames from multiple dance type video files as dance type live broadcast image samples; and randomly extracting multiple video frames from multiple non-dance type video files as non-dance type live broadcast image samples.

Exemplarily, the set keyword corresponding to the dance type may be a keyword through which a download address of a dance type video file can be searched for by using a specific search engine, such as a dance name or a dance library name; the set keyword corresponding to the non-dance type may be a keyword through which a download address of a non-dance type video file is searched for by using a specific search engine. For example, one of the dance type video files may be a video file having an video format such as .avi or .mov, which is searched for according to the dance name "Locking"; one of the non-dance type video files may be a video file having a video format such as .avi or .mov, which is searched for according to the keyword "streamer singing-type live broadcast video".

In one embodiment, after the download address is acquired, the download address is directly accessed and audio files in multiple resources are downloaded and stored in a sample library address of the corresponding type. When the first deep learning model needs to be trained, multiple video frames are randomly extracted from the dance type video files in the sample library as dance type live broadcast image samples, and multiple video frames are randomly extracted from the non-dance type video files in the sample library as non-dance type live broadcast image samples.

In S130, a display identifier is added to a live broadcast room corresponding to the live broadcast screenshot of the set type condition.

Exemplarily, each live broadcast room may be manually marked with a classification label by an anchor or a platform staff when the live broadcasting starts, live broadcast rooms marked with the same classification label are displayed in a display interface corresponding to the classification label, and display interfaces corresponding to multiple classification labels may be on a terminal used by the user. In the live broadcast process, the display identifier can be dynamically added to the live broadcast room according to whether a performance is in progress in multiple live broadcast rooms under the target classification label, that is, live broadcast rooms in which a performance is being currently performed are distinguished by using the display identifier. The display identifier may be an identifier specific to the live broadcast room in which the performance is currently in progress in all live broadcast rooms displayed under the target classification label. For example, the display identifier may be a segment of text mark or a pattern mark. For example, when the set type condition is the dance condition, a live broadcast screenshot that satisfies the dance condition is screened out by using the image detection model, and a display identifier "Dancing" is added to a live broadcast room corresponding to the live broadcast screenshot (i.e., the live broadcast room in which a dancing performance is currently in progress). If the image detection is performed again, when the live broadcast screenshot acquired from the live broadcast room labeled with the display identifier "Dancing" does not meet the dance condition, that is, the anchor in this live broadcast room has finished his dancing performance, this display identifier added on the live broadcast room is removed.

In the embodiments of the present application, the display identifier may be added to live broadcast rooms corresponding to all live broadcast screenshots of the set type condition, or the display identifier may be added to live broadcast rooms corresponding to part of live broadcast screenshots of the set type condition according to actual requirements.

Since the dancing performed by the anchor is a kind of performance form popular to the users, in the dance type live broadcast room display interface, live broadcast rooms in which the dancing performance is being currently performed and other dance type live broadcast rooms are labeled separately, so that the user can timely find the live broadcast rooms in which the dancing performance is currently in progress, and the operation that the user continuously clicks to enter different live rooms in order to find the live broadcast room in which the dancing performance is in progress is reduced, thereby attracting the user to watch, and on the other hand, improving the performance enthusiasm of the anchor, especially the dancing enthusiasm.

In S140, the at least one live broadcast room is arranged and displayed in a display interface corresponding to the target classification label according to the display identifier.

Exemplarily, multiple classification tabs may be displayed on the interface of the terminal used by the user, where each classification tab corresponds to a different classification label, and at least one live broadcast room under the classification label is displayed in the display interface corresponding to each classification tab, and when a live broadcast room with a display identifier added is included under the target classification label, live broadcast rooms with the display identifier added are displayed distinctively from other live broadcast rooms without any display identifier added. In one embodiment, the user can view all live broadcast rooms in which the live broadcasting is in progress under the target classification label by clicking a classification tab on the interface. Among these live broadcast rooms, live broadcast rooms with the display identifier are live broadcast rooms in which a performance is in progress, and other live broadcast rooms without display identifier are live broadcast rooms in which a performance is not in progress, thereby realizing timely and effective display of live broadcast rooms in which a performance is in progress to the user, and making it easy for the user to timely and effectively find live broadcast rooms in which a performance is in progress.

Figure 1B:
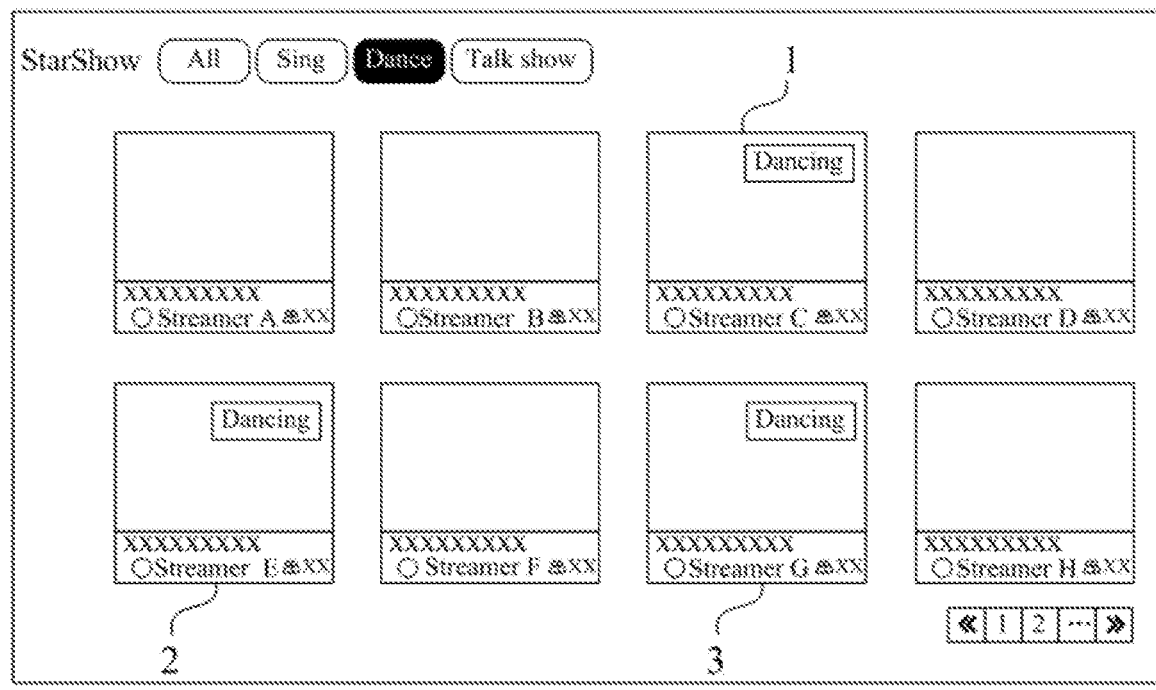
FIG. 1B is a schematic view showing a live broadcast room display interface provided by the embodiment one of the present application.

For example, current live broadcast screenshots are acquired from the multiple dance type live broadcast rooms respectively and input to the image detection model one by one. If a live broadcast screenshot that satisfies the dance condition is obtained, a display identifier is added to the live broadcast room to which the live broadcast screenshot belongs. In the interface of the terminal used by the user, as shown in FIG. 1B, the related information of multiple dance type live broadcast rooms is displayed in the display interface corresponding to the "Dance" label, for example, a live broadcast interface thumbnail or a corresponding preset cover of this live broadcast room is displayed. "Dancing" is displayed on pictures corresponding to dance type live broadcast rooms with the display identifier added in the terminal interface (such as the first live broadcast room 1, the second live broadcast room 2 and the third live broadcast room 3) such that these live broadcast rooms can be displayed distinctively from other dance type live broadcast rooms without any display identifier added.

In the technical solutions of the present application, a live broadcast screenshot acquired from at least one live broadcast room under a target classification label is input into a trained image detection model to obtain a live broadcast screenshot that satisfies a set type condition, a display identifier is added to a live broadcast room corresponding to the live broadcast screenshot of the set type condition, and the at least one live broadcast room is arranged and displayed in a display interface corresponding to the target classification label according to the display identifier. By adding a display identifier to a live broadcast room according to live broadcast content in real time, live broadcast rooms in which a performance is in progress are displayed to a user in a timely and effective manner such that the user can timely find the live broadcast rooms in which the performance is currently in progress, thereby simplifying the operation of the user, attracting the user to watch, and increasing average online viewing time of the user.

Embodiment Two

Figure 2A:
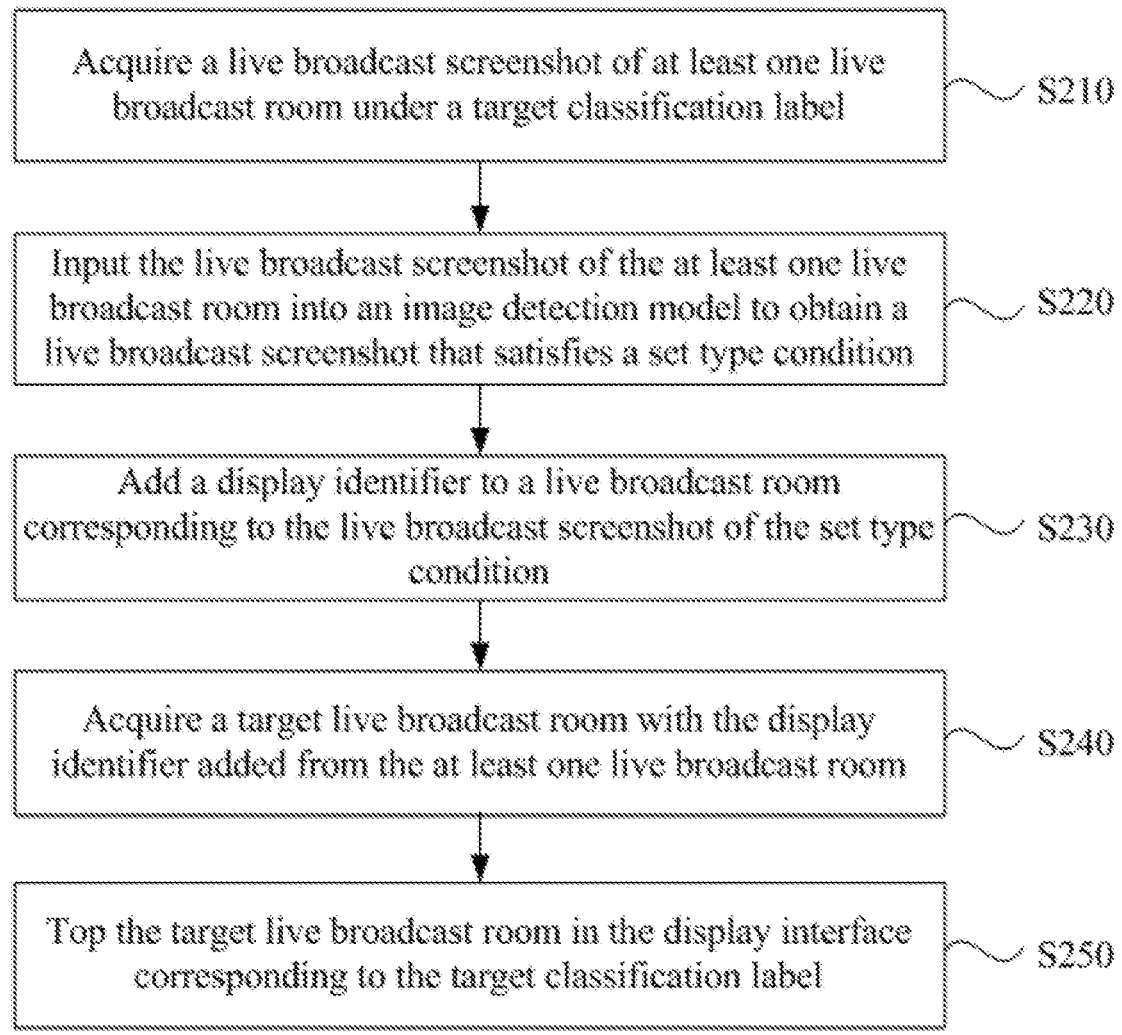
FIG. 2A is a flowchart of a method for displaying a live broadcast room provided by an embodiment two of the present application.

FIG. 2A is a flowchart of a method for displaying a live broadcast room according to an embodiment two of the present application. This embodiment is illustrated on the basis of the above embodiments, and provides a method for displaying a live broadcast room. This embodiment describes that at least one live broadcast room is arranged and displayed in a display interface corresponding to the target classification label according to the display identifier. The method provided by this embodiment includes the steps describe below.

In S210, a live broadcast screenshot of at least one live broadcast room under a target classification label is acquired.

In S220, the live broadcast screenshot of the at least one live broadcast room is input into an image detection model to obtain a live broadcast screenshot that satisfies a set type condition.

In S230, a display identifier is added to a live broadcast room corresponding to the live broadcast screenshot of the set type condition.

In S240, a target live broadcast room with the display identifier added is acquired from the at least one live broadcast room.

In this embodiment, the target live broadcast room with the display identifier added is a live broadcast room corresponding to all live broadcast screenshots that meet the set type condition.

For example, the target live broadcast room in dance type live broadcast rooms is a live broadcast room in which a dancing performance is being currently performed. The display identifier may be an identifier specific to the live broadcast room in which the performance is currently in progress in all live broadcast rooms displayed under the target classification label.

For example, the display identifier may be a segment of text mark or a pattern mark. For example, all live broadcast rooms marked with "Dancing" are acquired from dance type live broadcast rooms as target live broadcast rooms.

In S250, the target live broadcast room is topped in the display interface corresponding to the target classification label.

Exemplarily, if a live broadcast room with a display identifier added, i.e., the target live broadcast room, is contained under the target classification label, the live broadcast room with the display identifier added is topped in the display interface corresponding to the target classification label, that is, the live broadcast room with the display identifier added is arranged before other live broadcast rooms with no display identifier added. In one embodiment, when the number of target live broadcast rooms is multiple, the multiple target live broadcast rooms may be arranged in a preset arranging manner and then topped for display, where the preset arranging manner includes, but is not limited to, an arranging manner in accordance to the number of current users in the target live broadcast room or an arranging manner in accordance to performance scores.

Topping the target live broadcast room for display has the following advantages: the live broadcast room in which a performance is being currently performed can be displayed at a more prominent position, which is compatible with the observation habit of human beings from top to bottom, such that the user can conveniently and quickly find the live broadcast room in which the performance is in progress, and the user is attracted to watch; and on the other hand, in order to enable his live broadcast room at a position which is easy to be found, the anchor may improve the performance frequency, thereby improving the performance enthusiasm of the anchor.

Figure 2B:
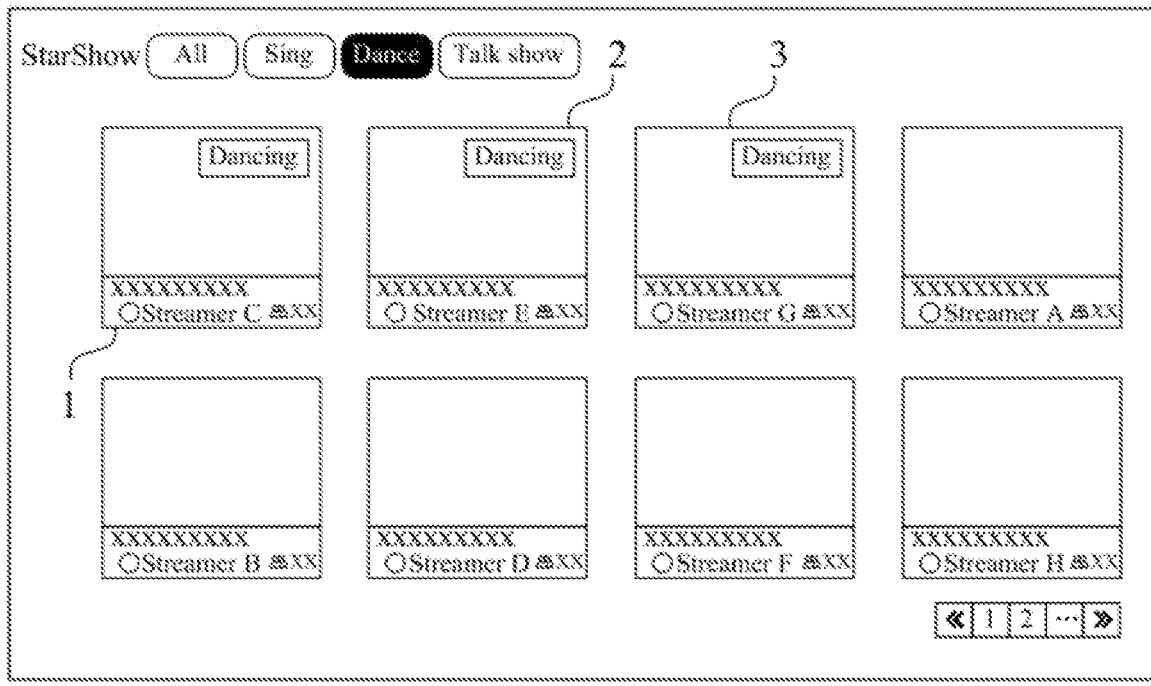
FIG. 2B is a schematic view showing a live broadcast room display interface provided by the embodiment two of the present application.

For example, as shown in FIG. 2B, in the interface of the user terminal, the related information of multiple dance type live broadcast rooms is displayed in the display interface corresponding to the "Dance" label, such as a live broadcast interface thumbnail (or a corresponding preset cover) of the live broadcast room, information on the anchor of the live broadcast room (such as nicknames and profile photos), individuality signature of the anchor, the number of users currently in the live broadcast room and the like, and the live broadcast rooms labeled with the "Dancing" is displayed on top, so as to be arranged and displayed in front of other live broadcast rooms without "Dancing" labeled.

In one embodiment, the step of topping the target live broadcast room in the display interface corresponding to the target classification label includes the following steps: acquiring a live broadcast video clip within a set duration of the target live broadcast room; inputting the live broadcast video clip into a dance scoring model to obtain scoring information corresponding to the target live broadcast room; and arranging and displaying the target live broadcast room in the display interface corresponding to the target classification label according to the soring information.

Exemplarily, a live video clip of the target live broadcast room from a current system timestamp to a target timestamp can be captured in real time. The target timestamp may be a timestamp that has been played and is played back for a set duration based on the current system timestamp. For example, if the current system time is 20:30:15 and the set duration is 5 seconds, a live broadcast video clip ranged from 20:30:10 to 20:30:15 in the live broadcast video of the target live broadcast room is acquired.

In this embodiment, the dance scoring model is used to classify the input live broadcast video clips and recognize live broadcast screenshots that meet a preset scoring condition. The preset scoring condition may include a 100-point condition, a 90-point condition, a 60-point condition, and the like. In this embodiment, the dance scoring model may be a model trained according to a preset deep learning algorithm. Exemplarily, the acquired live broadcast video clip is input into the image detection model, and the scoring information corresponding to the live broadcast room output by the image detection model is a specific score, such as 100, 90, or 60, etc.

In one embodiment, the operation principle of the dance scoring model may be that when a live broadcast video clip is input, the dance scoring model performs human action recognition on the input live broadcast video chip, analyzes recognized human action information, determines whether the human action information included in the input live broadcast video clip satisfies the preset scoring condition, and outputs the scoring information corresponding to the preset scoring condition as the scoring information of the target live broadcast room. For example, a live broadcast video clip acquired from a live broadcast room in which an anchor is dancing currently is input into the dance scoring model, and after performing recognition and analysis on the live broadcast video chip, if the dance scoring model determines that the live broadcast video clip satisfies the 90-point condition, the probability of outputting the score of the live broadcast video clip of 90 is high.

The object of inputting the live broadcast video clip into the dance scoring model in this embodiment is to score the dance of the anchor in the live broadcast room in real time according to the content of the live broadcast video clip, so as to arrange the target live broadcast room according to the score and displayed the arranged target live broadcast room before the other non-target live broadcast rooms, so that the user can quickly find the live broadcast room with the best dance performance.

Exemplarily, in the display interface corresponding to the target classification label, i.e., the display interface corresponding to the "Dance" label shown in FIG. 2B, all live broadcast rooms marked with "Dancing" are arranged according to scores and then displayed. In one embodiment, the target live broadcast rooms can be arranged according to current scores in the scoring information corresponding to multiple live broadcast rooms in a descending order and then displayed. For example, as shown in FIG. 2B, the live broadcast rooms marked "Dancing" are a first live broadcast room 1, a second live broadcast room 2, and a third broadcast live room 3. Since the score of the dance of the anchor in the first broadcast live room 1 is 90, the score of the dance of the anchor in the second broadcast live room 2 is 80, and the score of the dance of the anchor in the third broadcast live room 3 is 70, the first live broadcast room 1 is displayed in a first position, the second live broadcast room 2 is displayed in a second position, the third live broadcast room 3 is displayed in a third position, and the first live broadcast room 1, the second live broadcast room 2 and the third live broadcast room 3 are displayed at the top.

A beneficial effect of adding a scoring mechanism to the target live broadcast room in this embodiment is that importance attached to the singing quality by the anchor can be improved, and the viewing experience of the user can be improved, thereby attracting more users to watch the performance of the anchor.

In one embodiment, before the live broadcast video clip is input into a dance scoring model to obtain scoring information corresponding to the target live broadcast room, the method further includes the following steps: respectively obtaining dance video samples corresponding to multiple scoring levels; and training a second deep learning model by using the dance video samples to obtain the dance scoring model.

In this embodiment, the dance video sample may be extracted from multiple live broadcast videos in the online live broadcast platform, or may be downloaded from the Internet through a specific search engine, which is not limited herein. Taking a case of extracting the dance video sample from multiple live broadcast videos on the online live broadcast platform as an example, live broadcast videos containing the dancing performance are searched for from a target online live broadcast platform, then multiple dance performance video clips are extracted from multiple live broadcast videos respectively, and the extracted dance performance video clips are manually evaluated and scored so as to obtain dance video samples corresponding to multiple scoring levels.

In this embodiment, the second deep learning model may be a training model established based on an artificial neural network algorithm, such as Recurrent Neural Network (RNN). RNN is an artificial neural network where nodes are connected to form a ring in an oriented manner, and the internal state of this kind of networks can display dynamic temporal action. Different from the feedforward neural network, RNN may use internal memory to process input sequences in any time sequence, which makes it easier for RNN to handle segment-free speech recognition, video recognition and so on. In one embodiment, the training process of the second deep learning model can be the process of adjusting neural network parameters. The optimal neural network parameters can be obtained through continuous training, and the second deep learning model having the optimal neural network parameters is the final model to be obtained.

Exemplarily, after multiple dance video samples corresponding to multiple scoring levels are obtained, the second deep learning model is trained by using the dance video samples corresponding to multiple scoring levels, and the neural network parameters in the second deep learning model are constantly adjusted such that the second deep learning model gets the ability to score the input live broadcast video clip, so that the video scoring model is obtained.

In the technical solution of this embodiment, the target live broadcast room with the display identifier added is topped in the display interface corresponding to the target classification label for display such that the live broadcast room in which the performance is currently in progress can be displayed in a more conspicuous position. Therefore, the user can conveniently and quickly find the live broadcast room in which the performance is in progress, the operation of the user is simplified, the user is attracted to watch, and the average online viewing time of the user is increased; and on the other hand, in order to enable his live broadcast room at a position which is easy to be found, the anchor may improve the performance frequency, thereby improving the performance enthusiasm of the anchor.

Embodiment Three

Figure 3:
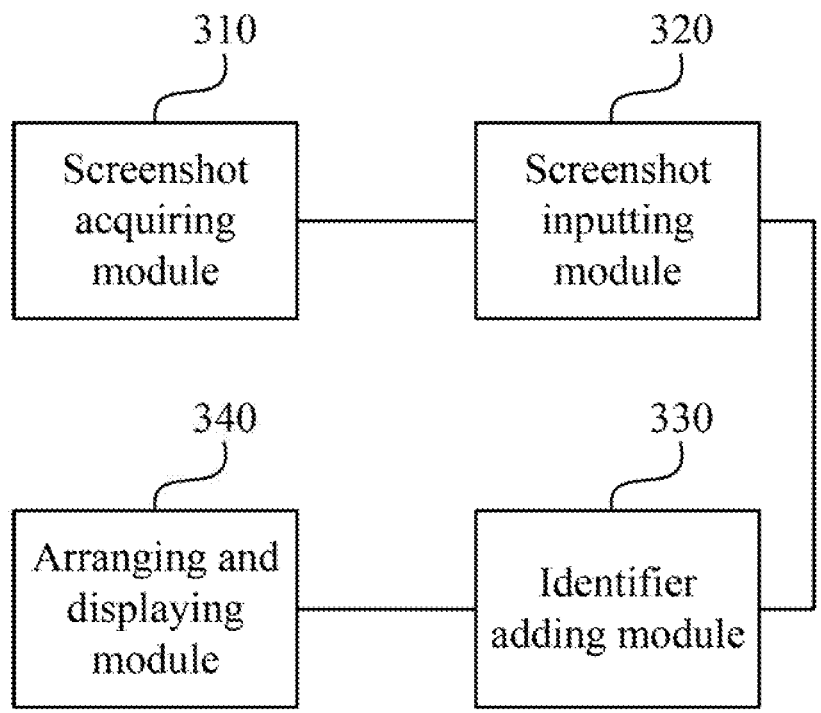
FIG. 3 is a structural diagram of an apparatus for displaying a live broadcast room provided by an embodiment three of the present application.

FIG. 3 is a structural diagram of an apparatus for displaying a live broadcast room according to an embodiment three of the present application. With reference to FIG. 3, the apparatus for displaying a live broadcast room includes a screenshot acquiring module 310, a screenshot inputting module 320, an identifier adding module 330, and an arranging and displaying module 340. The various modules are described below.

The screenshot acquiring module 310 is configured to acquire a live broadcast screenshot of at least one live broadcast room under a target classification label.

The screenshot inputting module 320 is configured to input the live broadcast screenshot of the at least one live broadcast room into an image detection model to obtain a live broadcast screenshot that satisfies a set type condition.

The identifier adding module 330 is configured to add a display identifier to a live broadcast room corresponding to the live broadcast screenshot of the set type condition.

The arranging and displaying module 340 is configured to arrange and display the at least one live broadcast room according to the display identifier in a display interface corresponding to the target classification label.

In the apparatus for displaying a live broadcast room provided by this embodiment, through the screenshot acquiring module 310, the screenshot inputting module 320, the identifier adding module 330 and the arranging and displaying module 340, a live broadcast screenshot acquired from at least one live broadcast room under a target classification label is input into a trained image detection model to obtain a live broadcast screenshot that satisfies a set type condition, a display identifier is added to a live broadcast room corresponding to the live broadcast screenshot that satisfies the set type condition, and the at least one live broadcast room is arranged and displayed in a display interface corresponding to the target classification label according to the display identifier. By adding a display identifier to a live broadcast room according to live broadcast content in real time, live broadcast rooms in which a performance is in progress is displayed to a user in a timely and effective manner such that the user can timely find the live broadcast rooms in which a performance is currently in progress, thereby simplifying the operation of the user, attracting the user to watch, and increasing average online viewing time of the user.

In one embodiment, the set type condition may include a dance condition.

In one embodiment, the image detection model is obtained by training a first deep learning model using dance type live broadcast image samples and non-dance type live broadcast image samples.

In one embodiment, the apparatus for displaying a live broadcast room may further include a sample acquiring module and a model training module.

The sample acquiring module is configured to respectively obtain dance class live broadcast image samples and non-dance class live broadcast image samples before the live broadcast screenshot of the at least one live broadcast room is input into the image detection model to obtain the live broadcast screenshot that satisfies the set type condition.

The model training module is configured to train the first deep learning model by using the dance type live broadcast image samples and the non-dance type live broadcast image samples to obtain the image detection model.

In one embodiment, the sample acquiring module is configured to: call a search engine interface to search for and download multiple video files matched with set keywords corresponding to the dance type and the non-dance type respectively; respectively extract multiple video frames from multiple dance type video files as dance type live broadcast image samples; and randomly extract multiple video frames from multiple non-dance type video files as non-dance type live broadcast image samples.

In one embodiment, the arranging and displaying module 340 may include a target acquiring sub-module and a topping display sub-module.

The target acquiring sub-module is configured to obtain a target live broadcast room with the display identifier added from the at least one live broadcast room.

The topping display sub-module is configured to top the target live broadcast room in the display interface corresponding to the target classification label for display.

In one embodiment, the topping display sub-module is configured to: acquire a live broadcast video clip within a set duration of each target live broadcast room; input the live broadcast video clip into a dance scoring model to obtain scoring information corresponding to the target live broadcast room; and arrange and display the target live broadcast room in the display interface corresponding to the target classification label according to the scoring information.

In one embodiment, the topping display sub-module is configured to, before the live broadcast video clip is input into a dance scoring model to obtain scoring information corresponding to the target live broadcast room, respectively obtain dance video samples corresponding to multiple scoring levels; and train a second deep learning model by using the dance video samples to obtain the dance scoring model.

The above products can execute the method provided by any embodiment of the present application, and has functional modules and beneficial effects corresponding to the execution method.

Embodiment Four

Figure 4:
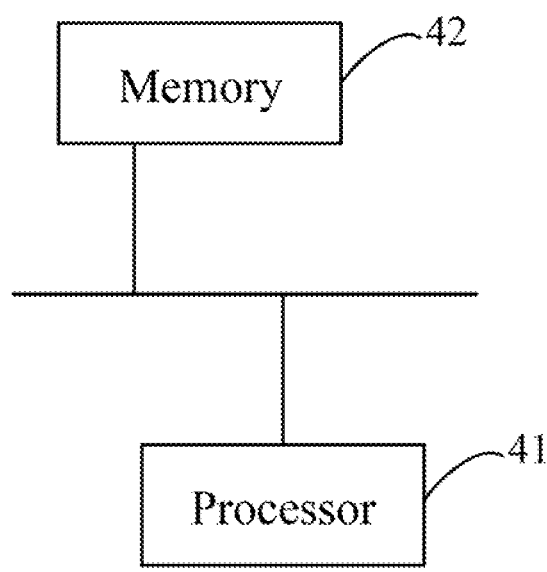
FIG. 4 is a structural diagram of a computer device provided by an embodiment four of the present application.

FIG. 4 is a structural diagram of a computer device according to an embodiment four of the present application. As shown in FIG. 4, the computer device provided by this embodiment includes a processor 41 and a memory 42. The number of processors in the computer device may be one or more, and one processor 41 is used as an example in FIG. 4 for illustration. The processor 41 and the memory 42 in the computer device may also be connected via a bus or in other manners, and connecting via a bus is used as an example in FIG. 4 for illustration.

The processor 41 of the computer device in this embodiment integrates the apparatus for displaying a live broadcast room provided in the embodiments described above. In addition, as a computer-readable storage medium, the memory 42 in the computer device can be configured to store one or more programs. The programs may be software programs, computer-executable programs and modules thereof, such as program instructions/modules corresponding to the live broadcast room display method in the embodiments of the present invention (e.g., modules in the live broadcast room display apparatus shown in FIG. 3, which includes the screenshot acquiring module 310, the screenshot inputting module 320, the identifier adding module 330 and the arranging and displaying module 340). The processor 41 operates the software programs, instructions or modules stored in the memory 42 to execute function applications and data processing, that is, to implement the method for displaying a live broadcast room in the above method embodiments.

The memory 42 may include a program storage region and a data storage region. The program storage region may store an operating system and an application program required by at least one function; and the data storage region may store data created depending on use of a device.

Furthermore, the memory 42 may include a high speed random access memory, and may also include a nonvolatile memory such as at least one disk memory, flash memory or another nonvolatile solid state memory. In some examples, the memory 42 may include memories which are remotely disposed relative to the processor 41 and these remote memories may be connected to the device via a network. Examples of the above network include, but are not limited to, the Internet, an intranet, a local area network, a mobile communication network and a combination thereof.

When executed by the one or more processors 41, the one or more programs included in the above computer device execute following operations.

A live broadcast screenshot of at least one live broadcast room under a target classification label is acquired; the live broadcast screenshot of the at least one live broadcast room is inputted into an image detection model to obtain a live broadcast screenshot that satisfies a set type condition; a display identifier is added to a live broadcast room corresponding to the live broadcast screenshot of the set type condition; and the at least one live broadcast room is arranged and displayed according to the display identifier in a display interface corresponding to the target classification label.

Embodiment Five

The embodiment five of the present application further provides a computer-readable storage medium having a computer program stored thereon that, upon execution by the apparatus for displaying a live broadcast room, implements the method for displaying a live broadcast room provided by the embodiment one of the present application. The method includes: acquiring a live broadcast screenshot of at least one live broadcast room under a target classification label; inputting the live broadcast screenshot of the at least one live broadcast room into an image detection model to obtain a live broadcast screenshot that satisfies a set type condition; adding a display identifier to a live broadcast room corresponding to the live broadcast screenshot of the set type condition; and arranging and displaying the at least one live broadcast room according to the display identifier in a display interface corresponding to the target classification label.

Of course, in the computer-readable storage medium provided by this embodiment of the present application, the computer program stored thereon implements not only the above method operations but also related operations in the method for displaying a live broadcast room provided by any embodiment of the present application.

From the above description of embodiments, it will be apparent to those skilled in the art that the present application may be implemented by software and general-purpose hardware, or may of course be implemented by hardware. Based on this understanding, the technical solutions provided by the present application may be embodied in the form of a software product. The software product is stored in a computer-readable storage medium, such as a computer floppy disk, a read-only memory (ROM), a random access memory (RAM), a flash, a hard disk or an optical disk, and includes several instructions for enabling a computer device (which may be a personal computer, a server or a network device) to execute the method of any embodiment of the present application.

Various units and modules included in the embodiment of the live broadcast room display apparatus are just divided according to functional logic, and the division is not limited to this, as long as the corresponding functions can be realized. In addition, the name of the each functional unit is just intended for distinguishing, and is not to limit the protection scope of the embodiments of the present application.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for displaying a live broadcast room, comprising:
    acquiring a live broadcast screenshot of at least one live broadcast room under a target classification label;
    inputting the live broadcast screenshot of the at least one live broadcast room into an image detection model to obtain a live broadcast screenshot that satisfies a set type condition;
    adding a display identifier to a live broadcast room corresponding to the live broadcast screenshot of the set type condition; and
    arranging and displaying the at least one live broadcast room according to the display identifier in a display interface corresponding to the target classification label.

2. The method of claim 1, wherein the set type condition comprises a dance condition.

3. The method of claim 2, wherein the image detection model is obtained by training a first deep learning model using dance type live broadcast image samples and non-dance type live broadcast image samples.

4. The method of claim 2, before the inputting the live broadcast screenshot of the at least one live broadcast room into the image detection model to obtain the live broadcast screenshot that meets the set type condition, further comprising:
    respectively obtaining dance type live broadcast image samples and non-dance type live broadcast image samples; and
    training the first deep learning model by using the dance type live broadcast image samples and the non-dance type live broadcast image samples to obtain the image detection model.

5. The method of claim 4, wherein the respectively obtaining the dance type live broadcast image samples and the non-dance type live broadcast image samples comprises:
    calling a search engine interface to search for and download a plurality of video files matched with set keywords corresponding to the dance type and the non-dance type, respectively;
    respectively extracting a plurality of video frames from a plurality of dance type video files to configure as the dance type live broadcast image samples; and randomly extracting a plurality of video frames from a plurality of non-dance type video files to configure as the non-dance type live broadcast image samples.

6. The method of claim 2, wherein the arranging and displaying the at least one live broadcast room according to the display identifier in the display interface corresponding to the target classification label comprises:

obtaining a target live broadcast room with the display identifier added from the at least one live broadcast room; and topping the target live broadcast room in the display interface corresponding to the target classification label.

7. The method of claim 6, wherein the topping the target live broadcast room in the display interface corresponding to the target classification label comprises:

acquiring a live broadcast video clip within a set duration of the target live broadcast room;

inputting the live broadcast video clip into a dance scoring model to obtain scoring information corresponding to the target live broadcast room; and arranging and displaying the target live broadcast room in the display interface corresponding to the target classification label according to the scoring information.

8. The method of claim 7, before the inputting the live broadcast video clip into the dance scoring model to obtain the scoring information corresponding to the target live broadcast room, further comprising:

respectively obtaining dance video samples corresponding to a plurality of scoring levels; and training a second deep learning model by using the dance video samples to obtain the dance scoring model.

9. An apparatus for displaying a live broadcast room, comprising:

a screenshot acquiring module, which is configured to acquire a live broadcast screenshot of at least one live broadcast room under a target classification label;

a screenshot inputting module, which is configured to input the live broadcast screenshot of the at least one live broadcast room into an image detection model to obtain a live broadcast screenshot that satisfies a set type condition;

an identifier adding module, which is configured to add a display identifier to a live broadcast room corresponding to the live broadcast screenshot of the set type condition; and an arranging and displaying module, which is configured to arrange and display the at least one live broadcast room according to the display identifier in a display interface corresponding to the target classification label.

10. A computer device, comprising:

at least one processor; and a memory, which is configured to store at least one program;

wherein when executed by the at least one processor, the at least one program enables the at least one processor to implement the method for displaying a live broadcast room of claim 1.

11. A non-transitory computer-readable storage medium, which is configured to store a computer program, wherein when executed by a processor, the computer program implements the method for displaying a live broadcast room of claim 1.

* * * * *